(12) United States Patent
Grzesiak et al.

(10) Patent No.: US 9,120,269 B2
(45) Date of Patent: Sep. 1, 2015

(54) DEVICE AND METHOD FOR FEEDING A MATERIAL LAYER ONTO A CONSTRUCTION PLATFORM, OR ONTO AT LEAST ONE MATERIAL LAYER LOCATED ON THE CONSTRUCTION PLATFORM, FOR PRODUCING AN OBJECT IN THE COURSE OF A GENERATIVE PRODUCTION METHOD

(75) Inventors: Andrzej Grzesiak, Stuttgart (DE); Oliver Refle, Reutlingen (DE); Hans-Jürgen Richter, Dresden (DE); Reinhard Lenk, Dresden (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 852 days.

(21) Appl. No.: 13/377,156

(22) PCT Filed: Jun. 2, 2010

(86) PCT No.: PCT/EP2010/003351
§ 371 (c)(1),
(2), (4) Date: Jan. 24, 2012

(87) PCT Pub. No.: WO2010/142398
PCT Pub. Date: Dec. 16, 2010

(65) Prior Publication Data
US 2012/0118705 A1 May 17, 2012

(30) Foreign Application Priority Data
Jun. 9, 2009 (DE) .......................... 10 2009 024 334

(51) Int. Cl.
B05C 19/00 (2006.01)
B22F 3/00 (2006.01)
(Continued)

(52) U.S. Cl.
CPC ............ *B29C 67/0085* (2013.01); *B22F 3/1055* (2013.01); *B22F 2003/1056* (2013.01); *B22F 2998/00* (2013.01)

(58) Field of Classification Search
USPC ............ 118/308, 76, 106; 156/264, 256, 267; 425/174.4; 264/401; 427/180
See application file for complete search history.

(56) References Cited

U.S. PATENT DOCUMENTS 5,143,817 A 9/1992 Lawton et al.
5,447,822 A 9/1995 Hull et al.
(Continued)

FOREIGN PATENT DOCUMENTS

DE 198 53 978 C1 11/1998
DE 10 2006 019 860 A1 11/2006
(Continued)

OTHER PUBLICATIONS
DE 19853978 (C1), May 25, 2000, all pages.*

*Primary Examiner* — Yewebdar Tadesse
(74) *Attorney, Agent, or Firm* — Fitch, Even, Tabin & Flannery LLP

(57) ABSTRACT

A device and a method are described for feeding a material layer onto a construction platform, or onto at least one material layer located on the construction platform, for producing an object, which is mounted to linearly move relative to a material reservoir and the construction platform along a motion plane. A circulating band is stretched around at least two molded bodies and contacts the molded bodies at least in segments. A drive circulates the band around the at least two bodies. The band has a band segment which can be fixedly in position relative to at least one body in the longitudinal section around the at least two molded bodies. At least the segments contact the material stored in the material reservoir during the linear motion from the material reservoir to the construction platform so that at least a part of the material is stripped off from the material reservoir and is applied as the material layer to the construction platform to compress the material layer.

22 Claims, 3 Drawing Sheets

(51) Int. Cl.
  *B29C 67/00* (2006.01)
  *B22F 3/105* (2006.01)

(56) References Cited

U.S. PATENT DOCUMENTS

| | | | |
|---|---|---|---|
| 5,637,175 | A | 6/1997 | Feygin et al. |
| 7,906,061 | B2 | 3/2011 | Partanen et al. |
| 2008/0156263 | A1 | 7/2008 | Montero-Escuder et al. |

FOREIGN PATENT DOCUMENTS

| | | |
|---|---|---|
| DE | 10 2004 061 836 B4 | 10/2007 |
| EP | 0 435 564 A2 | 12/1990 |
| EP | 0 693 591 A1 | 1/1996 |
| EP | 1 719 607 A1 | 8/2006 |
| JP | 6-155589 | 6/1994 |
| WO | WO 2008/061764 A1 | 5/2008 |

* cited by examiner

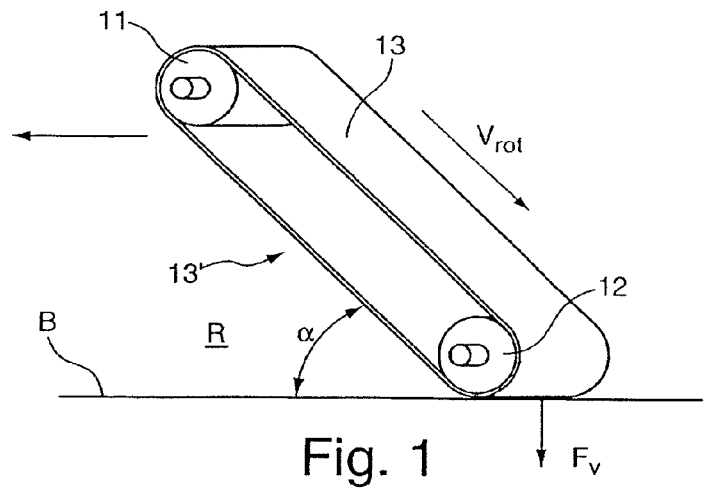
Fig. 1
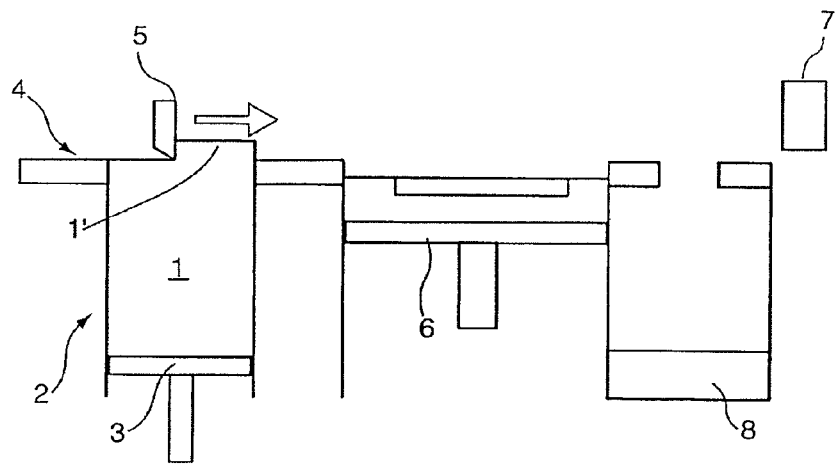
PRIOR ART
Fig. 2
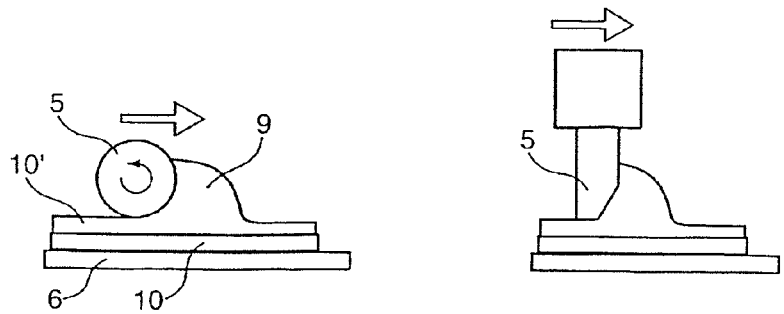
PRIOR ART
Fig. 3a
PRIOR ART
Fig. 3b

DEVICE AND METHOD FOR FEEDING A MATERIAL LAYER ONTO A CONSTRUCTION PLATFORM, OR ONTO AT LEAST ONE MATERIAL LAYER LOCATED ON THE CONSTRUCTION PLATFORM, FOR PRODUCING AN OBJECT IN THE COURSE OF A GENERATIVE PRODUCTION METHOD

BACKGROUND OF THE INVENTION

1. Field of the Invention

The invention relates to a device and a method for feeding a material layer onto a construction platform, or onto at least one material layer located on the construction platform, for producing an object in the course of a generative production method, which is mounted so it is linearly movable relative to a material reservoir and the construction platform along a motion plane, to which the material reservoir and the construction platform can be orthogonally deflected.

2. Description of the Prior Art

Generative manufacturing methods have already been used successfully for many years to produce three-dimensional objects, which are produced in the course of iterative joining of layer or volume elements onto or to one another. Manifold different materials are available as starting materials, which can be provided both in powder or granule form or also in the form of fluids, for example, as suspensions.

In addition to generative lamination and extruding technologies, which are also known under the name laminated object manufacturing (LOM) or fused deposition modeling (FDM), the further observations relate to generative production methods in which a plurality of individual material layers are deposited successively on a construction platform, which can preferably be lowered vertically, to form a three-dimensional object with the material layers being individually subjected to a local selective solidification process. Reference is made to FIG. 2 for the illustration of such a production method, which shows a schematic view of a device for producing an object in the course of layer-by-layer material deposition on a construction platform.

A material reservoir 2, which has a container implemented having an open top and a floor 3 which is movable vertically upward step-by-step. The reservoir stores the material 1, which is typically provided in powder or granule form. Setting of the height of the container floor 3, results in a material layer 1' having a predefined layer thickness protruding over an upper deposition plane 4, which directly adjoins the upper container opening of the material reservoir 2. With the aid of a stripping device 5, which is linearly movable from left to right in the exemplary embodiment shown according to FIG. 2, the material layer 1' protruding beyond the deposition plane 4 is stripped off and pushed in the direction of motion of the stripping device 5 toward a construction platform 6 adjoining directly on the right. The construction platform 6 is also mounted so it can be vertically lowered, and is lowered in relation to the deposition plane 4 in such a manner that the material carried along by the stripping device 5 can be applied uniformly distributed in the layered construction space between the deposition plane 4 and the uppermost material layer already deposited on the construction platform 6. In the example shown, material already applied by preceding deposition procedures is located on the construction platform 6, which has solidified in specific layer areas. Various method techniques are known for the local solidification of the respective uppermost applied material layer. In the scope of so-called selective sintering, laser or electron beam sources are a chosen to treat the respective material which is used. The material deposited on the construction platform is slightly fused or melted locally, whereby a solid material layer results after cooling. In addition to the known irradiation technologies, which cause material solidification based on coagulative processes, chemical activators can also be applied locally to the uppermost material layer in the form of so-called binders by means of suitably implemented applicators, preferably in the form of inkjet print heads, whereby the powder or granule particles within the material layer stick to one another and produce a solid adhesive bond to the solidified material layers located underneath. Such a print head is provided with the reference 7 in FIG. 2, which can be deflected horizontally along the motion plane 4 over the uppermost material layer deposited on the construction platform 6. Solely for the sake of completeness, it should be noted that a catch container 8 is located to the right of the construction platform, into which the excess material is introduced by the stripping device 5, which is suitable for reuse.

The production of the most compact and homogeneously distributed possible material layers on the construction platform is of particular interest, which various tools can be used to implement. A stripping device 5 implemented as a rotating roller is illustrated for this purpose in FIG. 3a, which guides a material portion 9 of pre-definable size with it in the motion direction (see arrow illustration). The rotating roller is guided vertically spaced apart from the construction platform 6 or a material layer 10 already located thereon in such a manner that a uniform, "fresh" material layer 10' forms directly following the roller in the motion direction. Through suitable distance setting between the roller-shaped stripping device 5 and the uppermost material layer 10 already applied to the construction platform 6, minimal layer thicknesses of approximately 100 µm can be generated. A blade-like stripping device 5 is illustrated in FIG. 3b, which is referred to as a squeegee or doctor blade. The material application is fundamentally performed in the area of the construction platform in the same way as in the above-described case of the illustration in FIG. 3a.

The publication DE 198 53 978 C1 discloses a slide which is used to strip the material off of a material reservoir and is applied in layers onto a construction platform. In addition, the device has a grinding apparatus fastened rigidly in front of the slide in the form of a roller coated with grinding material. The surface of the process layer, that is the material, is melted by a laser and is smoothed before the further material application.

In addition, application methods are known which apply brushes, funnels, or screen techniques. These methods in all known cases only form slightly or inadequately pre-compacted or compacted material layers on the construction platform. As a result, even after the further application of radiant energy or chemical activators to solidify selective layer areas, so-called green parts having a green part density which is to be increased, results especially because parts produced in this way are typically subjected to further treatment steps. For example thermal curing processes are used, which can cause material shrinkage or shape warping, which is to be avoided, in particular in cases in which the objects are precision parts or parts from prosthetics.

U.S. Pat. No. 5,637,175 discloses a device for performing a manufacturing method, in which material is applied from a material reservoir, which is situated over a construction platform, to the construction platform. By moving the construction platform, the material layer is smoothed on a smoothing apparatus and subsequently compressed by means of a stationary roller or also a band guided over rollers.

The publication DE 10 2006 019 860 A1 relates to a manufacturing method for producing three-dimensional objects from a liquid construction material which can be solidified by light. Construction material is applied to a circulating band or to a film which moves back and forth and transferred therefrom with as few bubbles as possible to a substrate.

SUMMARY OF THE INVENTION

The invention is based on the problem of refining a device and also a method for feeding a material layer onto a construction platform, or onto at least one material layer located on the construction platform, for producing an object in the course of a generative production method. A generative production method is a method for producing three-dimensional objects by the application of material layers from which the objects are constructed. The production method preferably is by selective sintering or 3-D printing technology, which is mounted so it is linearly movable relative to a material reservoir and the construction platform along a motion plane, to which the material reservoir and the construction platform can be deflected orthogonally. In such a manner, the material layers are applied in the area of the construction platform as uniformly distributed and highly compacted as possible. The device according to the invention is particularly for the processing of different materials, thus, in particular, dried powder materials and also pasty, fluid, or suspended materials, without harming the quality of a material layer application which is to be distributed uniformly. The green density achievable using the device and the method is to be at least 30%, preferably at least 40%.

The device according to the invention is distinguished by the stripping device being used for the purpose of providing a metered material transfer from the material reservoir in the area of the construction platform. A circulating band is stretched around at least two molded bodies which contacts at the molded bodies at least in segments. The band is circulated around the at least two molded bodies by a drive. The band has a band segment which is permanently assignable, relative to at least one molded body, in the longitudinal extension direction of the band. The band segment, at least in segments, contacts the material during the motion of the stripping device from the material reservoir to the construction platform. In this manner the material can be stripped off of the material reservoir and can be applied to the construction platform so that the applied material layer is compressed during the application. This band segment has a band surface area facing toward the material, which is inclined by an angle α in relation to the motion plane, along which the stripping device moves linearly. The angle α is not 90° and preferably ranges between 10° and 60°.

The stripping device implemented according to the invention, which is also referred to hereafter as the "band apparatus," in a simplest embodiment, is schematically shown in FIG. 1 The band apparatus has two cylindrical rollers 11 and 12 which have roller axes oriented parallel to one another. A band 13 is stretched around both cylindrical rollers 11 and 12, which is mounted to roll around both cylindrical rollers 11 and 12. At least one cylindrical roller 11 is driven by an electric motor to cause the band 13 to have a band circulation direction shown in FIG. 1 (see arrow illustration) with a pre-definable band circulation speed $v_{Rot}$. The illustrated band apparatus is moved from right to left relative to the motion plane B, which corresponds to the deposition plane 4 illustrated in FIG. 2, in the form shown in FIG. 1. During the linear motion, the lower cylindrical roller 12 strips the material layer protruding beyond the material reservoir using the band 13 which circulates around the roller. The material layer corresponds in the case of FIG. 2 to the material layer 1', which collects as a material portion in the wedge-shaped spatial area R, which is enclosed on one side by the band surface area 13' facing toward the material and on the other side by the motion plane B or the construction platform or the material layers already applied to the construction platform.

Because of the inclined angular position of the band apparatus defined by the angle α relative to the motion plane B, the material portion which is ablated from the material reservoir 1 experiences a pre-compression inside the wedge-shaped spatial area R because of the feed motion of the band apparatus and an accompanying material accumulation action in this area. In addition, there is a further action which compacts the material originating due to the band motion in the area of the lower cylindrical roller 12. The band 13 is guided around the cylindrical roller 12 in the area of the formation of the material layer in the motion direction of the band apparatus. As a result, the forming material layer experiences an additional dynamic compaction, in addition to the compacting force Fv acting vertically on the material layer via the cylindrical roller 12.

The device according to the invention is thus capable of compressing the layer material, which is typically provided in powder form, in two ways, namely, on the one hand, through the pre-compaction of the material portion in the course of a material accumulation in the wedge-shaped spatial area R. On the other hand, compression of the layer also occurs during the material deposition on the construction platform or on a material layer located on the construction platform, by a contact pressure, which is supported by the circulation direction of the band, on the material to be deposited.

In order to prevent adhesion of the powdered material on the band itself, a surface coating of the band, for example, by means of PTFE/Teflon and/or using a nanocoating, is advantageously suitable.

Depending on the type of the selected material to be applied and also the shape and size of the construction platform, the parameters may vary with respect to the translational motion of the band apparatus, the rotation of the band, and also a vertical force application via the band apparatus to the material layer to be applied, so that the parameters can be subjected to optimization depending on corresponding processing conditions.

The fundamental method of the device according to the invention is therefore based on the use of a band which circulates dynamically around at least two molded bodies spaced apart from one another. The band is guided to have a band area oriented to be inclined by an angle α in relation to the motion plane. The band area faces directly toward the material reservoir and the construction platform and engages with the material. In this case, the band area is guided over the material reservoir in such a manner that an uppermost material layer is stripped off of the material reservoir and transferred in the form of a material portion, which is enclosed between the inclined band area and the construction platform adjoining the material reservoir in the motion direction, into the area of the construction platform in which it is distributed uniformly in a compacting manner to form a superficial material layer.

BRIEF DESCRIPTION OF THE DRAWINGS

FIG. 1 illustrates a stripping device or band apparatus in accordance with the invention;

FIG. 2 is a schematic view of a prior art device for producing an object in the course of layer-by-layer material deposition on a construction platform;

FIG. 3a illustrates a prior art stripping device implemented as a rotating roller;

FIG. 3b illustrates a prior art blade-like stripping device (state of the art);

DETAILED DESCRIPTION OF THE INVENTION

Figure 4:
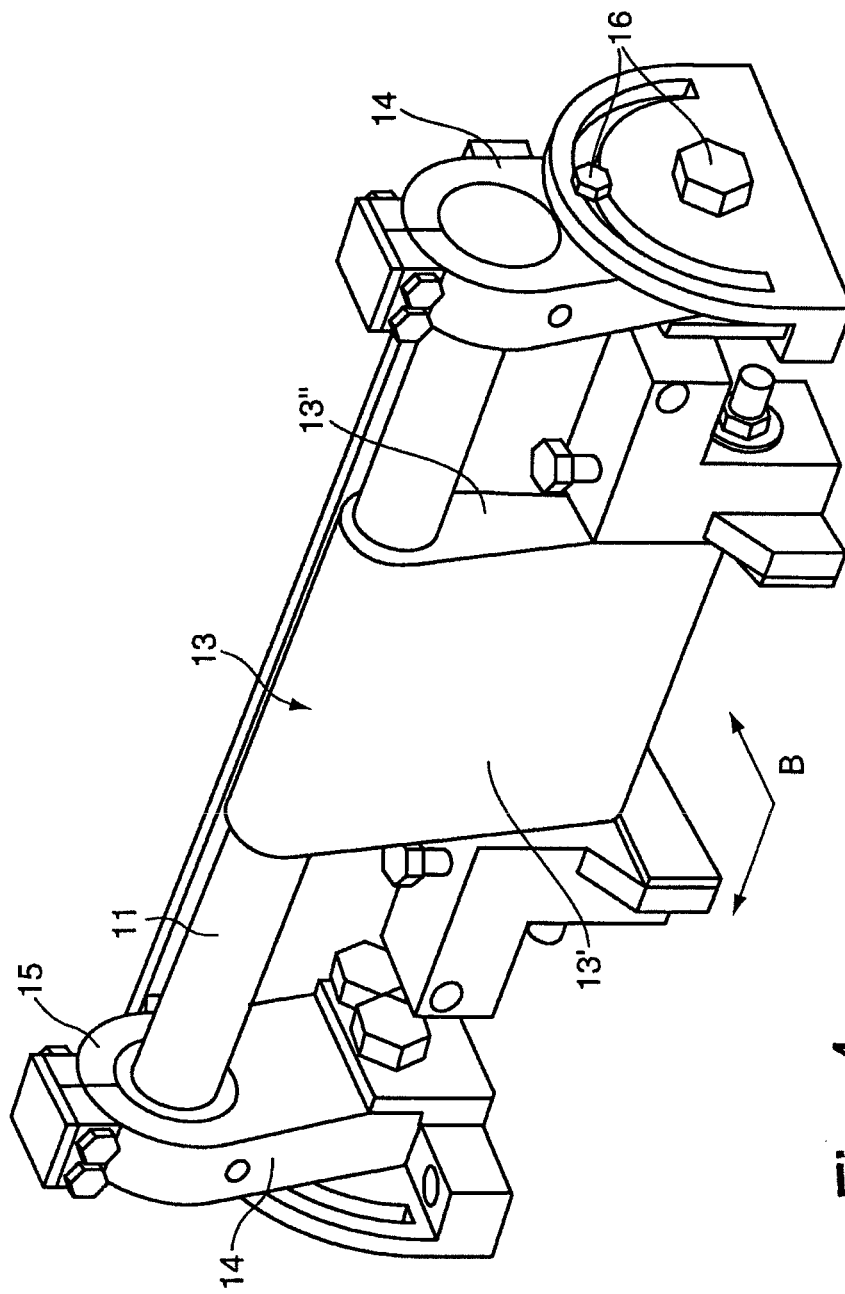
FIG. 4 illustrates an embodiment of a band apparatus in accordance with the invention.

An exemplary embodiment of a band apparatus, which is schematically shown in FIG. 1, is shown in detail in FIG. 4, which has two cylindrical rollers 11 and 12 with the cylindrical roller identified by reference sign 12 being concealed in FIG. 4 by the band 13 and is therefore not visible. The rollers 11 and 12 are situated at a fixed predefined distance each having cylindrical roller axes oriented parallel to one another via a spacer 14. The mutual spacing of both cylindrical rollers 11 and 12 is variably set via an eccentric mechanism 15, whereby the tension of the band 13 circulating around both cylindrical rollers 11 and 12 can be predefined.

In order to be able to variably set the inclination between band segments 13' and 13", which are stretched in parallel between both cylindrical rollers, relative to the motion plane B, the upper cylindrical roller 11 is positioned to be fixable and rotationally movable relative to the lower cylindrical roller 12 via a pivot mechanism 16. The entire band apparatus moves relative to a material reservoir (not shown) and a construction platform, whereby a fixed predefined material portion is transferred from the side of the material reservoir to the construction platform.

Figure 5:
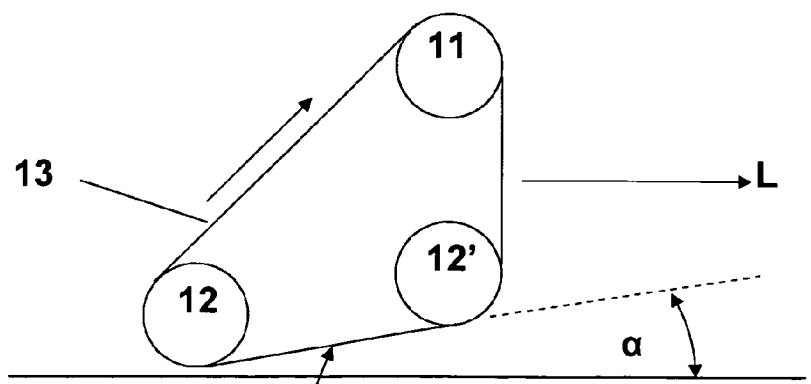
FIG. 5 illustrates a further embodiment of a band apparatus in accordance with the invention.

A further exemplary embodiment of a band apparatus implemented according to the invention is schematically shown in FIG. 5, which has three molded bodies in the form of cylindrical rollers 11, 12 and 12', around which the band 13 is moved in the band circulation direction indicated by the arrow. The band segment 17, which is inclined by the angle α to the motion plane B, comes into contact with the material to be deposited and exerts a pre-compressing effect on the material portion introduced into the wedge-shaped spatial area because of the linear translational motion L of the band apparatus. The angle α can be set arbitrarily, preferably in the range between 10° and 60°. The cylindrical roller 11 is preferably driven by a motor, by which the band 13 is set into motion in the circulation direction. Of course, it is also possible to reverse the band circulation direction, if this results in an effect which serves the application procedure.

Figure 6:
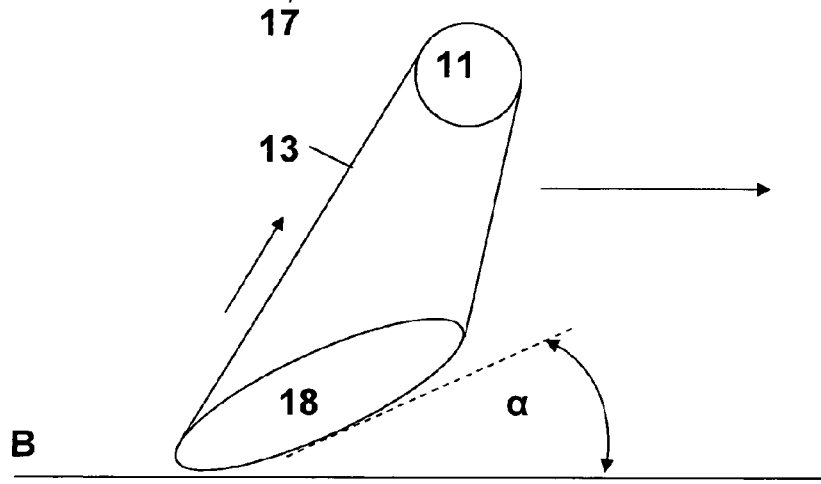
FIG. 6 illustrates another embodiment of a band apparatus in accordance with the invention.
Figure 7:
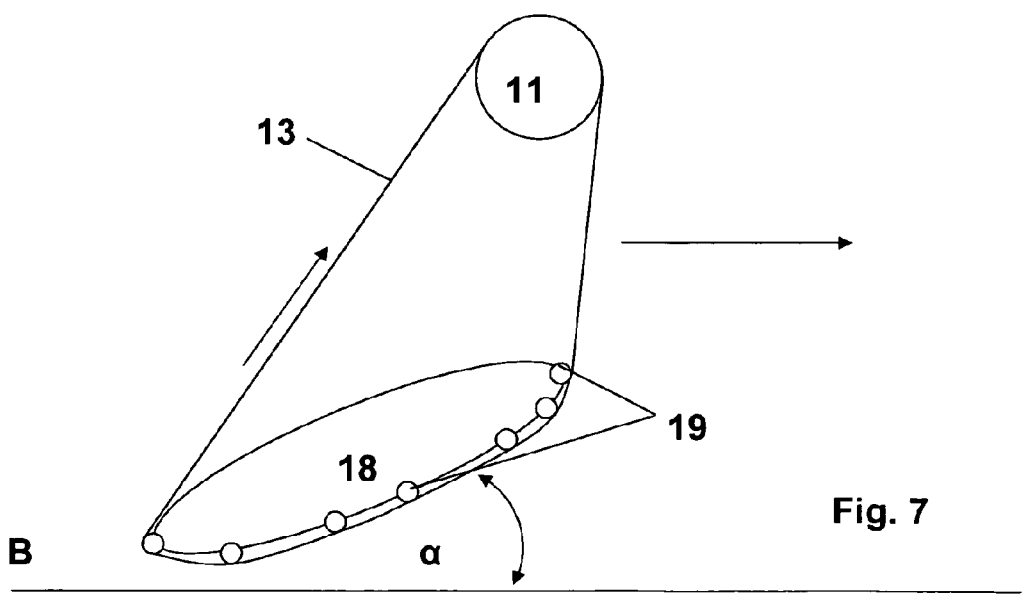
FIG. 7 illustrates a band apparatus with a sliding body in accordance with the invention/

A further exemplary embodiment of a band apparatus implemented according to the invention is illustrated in FIG. 6. A cylindrical roller 11 is driven by a motor. A rigidly implemented sliding body 18 guides the band 13 to slide in contact with the body. Similarly to the above-described exemplary embodiments, the oblong ellipsoidal sliding body 18 is also situated to be inclined relative to the motion plane B by an angle α which represents the inclination of the sliding body 18. The exemplary embodiment according to FIG. 7 has, in contrast to the exemplary embodiment according to FIG. 6, a sliding body 18, on whose surface area facing toward the band 13 roller elements 19 are attached so the band 13 is mounted to roll. In this case, the band 13 is guided over the sliding bodies 19 and also encloses an angle α with the motion plane B, which is variably settable in the above-described angle range.

With the aid of the device according to the invention, it is not only possible to apply powdered dry material onto a construction platform in pre-compressed form as a material layer. The band apparatus also allows processing of suspensions in the form of pastes or slurries. The band is coated appropriately, for example, with a nanocoating based on Teflon, to avoid adhesions to the band surface.

In addition, a preferred embodiment is permeated with pores which cause liquid to be sucked out of a fluid material layer toward the pores. The suctioning of the liquid can be performed by applying a partial vacuum, for example, in the area of the lower cylindrical roller 11 (see the schematic view in FIG. 1). The capillary forces prevailing inside the pores cause a separation of superficial liquid components from the material layer which is deposited on the construction platform.

A refined implementation of the band apparatus for further compaction of the material deposited in the area of the construction platform provides a metered coupling of vibrations, preferably by means of ultrasound, into the material layer deposited on the construction platform. For example, it is advisable for this purpose to couple the vibrations into the material via the molded body which comes into contact with the material via the band. For example, an ultrasound generator, which may be a piezoactuator, could be integrated inside the cylindrical roller 12 according to the embodiment in FIG. 1 or inside the sliding body 18 illustrated in FIGS. 6 and 7, by which the respective molded bodies are set into vibration which are sufficiently strong to cause the applied material to be compressed in the area of the construction platform while the layers lying underneath remain unimpaired. In addition, the ultrasonic waves generated inside the molded body propagate at least partially along the band course. As a result, additional compressing forces act on the material portion located inside the wedge-shaped spatial area. The precompressing function of the band apparatus may be improved further in this matter.

LIST OF REFERENCE SIGNS 1 material
1' protruding material layer
2 material reservoir
3 container floor
4 deposition plane
5 stripping device
6 construction platform
7 print head
8 catch container
9 material portion
10 deposited material layer
10' freshly deposited material layer
11 and 12 cylindrical roller
13 band
13' and 13" band segment
14 spacer
15 eccentric unit
16 pivot device
17 band segment
18 sliding body
19 roller body

The invention claimed is:

1. A device for producing an object by a production method comprising:
   a material reservoir, for storing a powdered or granular material, a construction platform, and a device for feeding a layer of the powdered or granular material onto the construction platform or onto at least one material layer located on the construction platform, the device for feeding the layer of the material being linearly movable along a motion plane, along which the material reservoir and the construction platform are positioned adjacent to one another and which can be deflected orthogonally thereto, and wherein
   the device for feeding the layer of the material includes a circulating band stretched around at least two bodies, which at least in segments press against at least two bodies;
   a drive for moving the band around the at least two bodies;
   the circulating band includes a band segment fixedly assignable relative to at least one body in a direction of motion of the band around the at least two bodies;
   the band segment has a surface area facing toward the material reservoir and the construction platform and is inclined in relation to the motion plane by an angle and encloses a wedge-shaped spatial region between the band surface area and the motion plane; and
   at least a part of the band segment contacts the powdered or granular material stored in the material reservoir during linear motion of the segments from the material reservoir to the construction platform so that at least a portion of material in the reservoir is stripped off from the material reservoir so that at least the portion collects in the wedge-shaped spatial region and is deposited in a material layer on the construction platform to form a compressed material layer.

2. A device according to claim 1, wherein:
   at least one of the bodies is a cylindrical roller.

3. A device according to claim 2, wherein:
   at least one body of the bodies is a rigid sliding body including one surface over which the band is guided by sliding and the one surface supports the circulating band surface area which is inclined by the angle.

4. A device according to claim 2, wherein:
   at least one body is rigid;
   at least one body of the bodies has a surface which supports the circulating band surface area and is inclined by the angle; and
   roller bodies are disposed at least on the surface over which the band rolls.

5. A device according to claim 2, wherein:
   the inclination of the circulating band surface by the angle is settable by cylindrical rollers having different diameters.

6. A device according to claim 2, wherein:
   the drive includes a cylindrical roller driven by a motor.

7. A device according to claim 1, wherein:
   the at least two bodies are cylindrical rollers each roller having a roller axis extending parallel to one another.

8. A device according to claim 7, wherein:
   the inclination of circulating band surface by the angle is settable by cylindrical rollers having different diameters.

9. A device according to claim 8, wherein:
   one of the cylindrical rollers is pivotable relative to another cylindrical roller.

10. A device according to claim 9, wherein:
    the drive includes a cylindrical roller driven by a motor.

11. A device according to claim 7, wherein:
    the drive includes a cylindrical roller driven by a motor.

12. A device according to claim 8, wherein:
    the drive includes a cylindrical roller driven by a motor.

13. A device according to claim 2, wherein:
    the at least two bodies are cylindrical rollers each roller having a roller axis extending parallel to one another.

14. A device according to claim 1, wherein:
    at least one body of the bodies is a rigid sliding body including one surface over which the band is guided by sliding and the one surface supports the circulating band surface area which is inclined by the angle.

15. A device according to claim 14, wherein:
    the drive includes a cylindrical roller driven by a motor.

16. A device according to claim 1, wherein:
    at least one body is rigid;
    at least one body of the bodies has a surface which supports the circulating band surface area and is inclined by the angle $\alpha$; and
    roller bodies are disposed at least on the surface over which the band rolls.

17. A device according to claim 16, wherein:
    the drive includes a cylindrical roller driven by a motor.

18. A device according to claim 1, wherein:
    the circulating band comprises a PTFE band or a coating of PTFE on the circulating band.

19. A device according to claim 1, wherein:
    the band surface facing toward the material includes a nanocoating.

20. A device according to claim 1, wherein:
    that the circulating band includes pores.

21. A device according to claim 1, wherein:
    the drive rotates the circulating band segment to contact the material in a circulation direction extending away from the motion plane.

22. A device according to claim 1, comprising:
    a vibration unit for generating vibrations which is integrated into at least one of the bodies.

* * * * *